UNITED STATES PATENT OFFICE.

LIVINGSTON A. THOMPSON, OF MILWAUKEE, WISCONSIN.

CONCENTRATED FOOD PRODUCT.

1,063,302.

Specification of Letters Patent. Patented June 3, 1913.

No Drawing. Application filed April 22, 1910. Serial No. 557,038.

*To all whom it may concern:*

Be it known that I, LIVINGSTON A. THOMPSON, a citizen of the United States, residing at Milwaukee, State of Wisconsin, have invented a new and useful Improvement in Concentrated Food Products, of which the following is a specification.

The object of this invention is to provide a concentrated food of great nutritive power and one especially adapted for use in the feeding of anemics and those of backward growth and at the same time minimize the cost of production of such food.

The present invention seeks to provide such a food which will be rich with iron in the most highly complex and organic form in order that it may be readily used for the formation of new hemoglobin molecules in the blood of the patient and at the same time will be of great food value both as a heat producer and as a tissue builder.

The concentrated food of this invention is produced by first treating fresh blood in order to break up the red blood corpuscles thereof so that the hemoglobin solution may pass out. This rupture of the blood cells may be accomplished by various means, as by the repeated freezing and thawing of the blood, or by a treatment with chemicals, such as ether, alcohol, etc., but preferably by adding water to the blood and allowing it to stand for a sufficient time to accomplish the purpose. Usually 48 pounds of fresh blood is allowed to stand from 3 to 6 hours in 200 pounds of water. The blood so treated is then subjected to a digestive process, first being warmed to about 90 degrees Fahrenheit at which temperature the digestive process will be more effective. Approximately 6 drams of scale pepsin and the same amount of papein is dissolved in water and then added to the blood and water and mixed therewith where it is allowed to act until digestion is completed, usually for about six hours, the mass in the meantime being retained at a temperature of approximately 100 degrees Fahrenheit and being constantly agitated. The digested blood is next filtered to remove solid matter therefrom and constitutes the main ingredient of the product, a starchy grain, such as wheat, and preferably the flour thereof which may be less expensive, is mixed with malt, usually barley malt, and allowed to stand at a suitable temperature to produce malted starch. For the quantity of digested blood above given, it is desirable to use approximately 10 pounds of wheat flour and 25 pounds of barley malt which are allowed to stand in a solution of water at a temperature of 165 degrees Fahrenheit for about three hours, or until all the starch is digested and the liquid will not turn blue with the iodin test. This malt solution is then strained to remove the husks and is mixed with the digested blood and the mixture of these two is reduced to a dry form in a vacuum pan or by other process of evaporation and then pulverized to a powder.

When it is desired to include milk as an ingredient of the preparation, it may be added to the mixture of the digested blood and malted starch before the evaporation process.

The powder product may be prepared for use by dissolving in water or milk and flavoring to suit the taste.

What I claim as new and desire to secure by Letters Patent is:

1. A concentrated dry food product composed of digested blood and malt sugar.
2. A concentrated dry food product composed of digested blood, sugar and milk.
3. The herein described method of preparing a concentrated food product which consists in first digesting blood by breaking open the red corpuscles thereof and subjecting it to the action of pepsin and papein, then adding sugar thereto in the form of a solution produced by allowing wheat flour and barley malt to stand together in water until the starch is digested, and then evaporating such mixture to a dry form.

In testimony whereof I have signed my name to this specification in the presence of two subscribing witnesses.

LIVINGSTON A. THOMPSON.

Witnesses:
 JOHN WOODMANSEE,
 ALBIAN R. NOLTE.